(12) United States Patent
Nicholson

(10) Patent No.: US 12,005,484 B2
(45) Date of Patent: Jun. 11, 2024

(54) APPARATUS, SYSTEM AND METHOD FOR USE WITHIN A TANK

(71) Applicant: CONTRACT RESOURCES PTY LTD, Sydney (AU)

(72) Inventor: Colin Brian Nicholson, Sydney (AU)

(73) Assignee: CONTRACT RESOURCES PTY LTD, Sydney (AU)

(*) Notice: Subject to any disclaimer, the term of this patent is extended or adjusted under 35 U.S.C. 154(b) by 0 days.

(21) Appl. No.: 18/131,974

(22) Filed: Apr. 7, 2023

(65) Prior Publication Data
US 2023/0264237 A1    Aug. 24, 2023

Related U.S. Application Data

(63) Continuation of application No. 17/258,390, filed as application No. PCT/AU2019/050353 on Apr. 18, 2019, now Pat. No. 11,648,596.

(51) Int. Cl.
| | |
|---|---|
| B08B 9/08 | (2006.01) |
| B08B 13/00 | (2006.01) |
| B25J 11/00 | (2006.01) |
| B25J 18/02 | (2006.01) |

(52) U.S. Cl.
CPC ............ *B08B 9/08* (2013.01); *B08B 13/00* (2013.01); *B25J 11/0085* (2013.01); *B25J 18/025* (2013.01); *B08B 2209/08* (2013.01)

(58) Field of Classification Search
CPC ....... B08B 9/08; B08B 13/00; B08B 2209/08; B08B 5/04; B08B 9/087; B08B 9/093; B08B 9/0933; B08B 9/0936; B25J 11/0085; B25J 18/025
See application file for complete search history.

(56) References Cited

U.S. PATENT DOCUMENTS

| | | |
|---|---|---|
| 5,179,757 A | 1/1993 | Grant, Jr. |
| 2004/0134518 A1 | 7/2004 | Kraus et al. |

FOREIGN PATENT DOCUMENTS

JP    H06285450 A    10/1994

OTHER PUBLICATIONS

International Search Report in corresponding PCT application No. PCT/AU2019/050353, dated Jun. 18, 2019.

*Primary Examiner* — David Redding
(74) *Attorney, Agent, or Firm* — William H. Honaker; Dickinson Wright PLLC

(57) ABSTRACT

In one example there is disclosed, an apparatus (10) for vacuum cleaning a tank (11). The apparatus (10) includes a main body (12) coupled to a working arm (14) and a plurality of support legs (16) coupled to the main body (12). The main body (12) includes a main conduit (40) extending lengthwise therethrough and a common central actuator (32) fitted about by the main conduit (40). The working arm (14) includes a vacuum conduit (50) in fluid communication with the main conduit (40). The plurality of support legs (16) are operatively coupled to the common central actuator (32) so as to be simultaneously moveable at least between a collapsed condition so as to fit through an opening 18 of the tank 11, and an extended condition in which the plurality of support legs (16) are moved relatively outwardly so as to be telescopically extendable within the tank (11) to engage a side wall (20) of the tank to support the main body (12). Other examples of the apparatus, a system and related methods are also disclosed.

20 Claims, 18 Drawing Sheets

APPARATUS, SYSTEM AND METHOD FOR USE WITHIN A TANK

CROSS REFERENCE TO RELATED APPLICATIONS

The present application is a continuation of U.S. non-provisional application Ser. No. 17/258,390, filed Jan. 6, 2021, now U.S. Pat. No. 11,648,596, which is a 35 U.S.C. § 371 national stage application of PCT Application No. PCT/AU2019/050353, filed Apr. 18, 2019, which claims priority to Australian provisional patent application no. 2018902459, filed Jul. 6, 2018, the entire contents of which are incorporated by reference in their entireties.

TECHNICAL FIELD

The invention relates to an apparatus, a system and a method for use within a tank, and in particular, the invention relates to a robotic or remote control apparatus for use within a tank for tasks such as vacuuming, cleaning, inspection or maintenance of a tank as well as an associated system and a method of use.

BACKGROUND

Tanks such as reactor tanks or vessels often need to be cleaned, inspected or otherwise accessed internally. However, such tanks are a confined space in which to work, may be relatively large, difficult to access via a top inspection hatch and often contain hazardous substances. Such tanks may include a catalyst or other material that needs to be removed and/or changed.

The cleaning, inspection and related maintenance activities of such tanks may be highly hazardous and therefore presents a problem of endangering the lives of involved personnel. Another problem relates to the efficiency and effectiveness of cleaning, inspecting or maintaining such tanks due to the size, access difficulties and hazardous substances.

Accordingly, devices have been developed that allow, for example, a robotic or remote control cleaning device deployed through the top inspection hatch to a location within the tank. One such robotic device is disclosed in US 2004/0134518 as having a rotating body, a vacuum cleaning arm, and stabilising arms to stabilise the robotic device within the reactor vessel. The robotic device may be controlled/monitored from a remote control station in communication with the robotic device.

Problems with such devices include, but are not limited to, the compactness of the robotic device to fit through a tank opening, the structural integrity of the overall device, in particular the stabilising arms, and also the effectiveness and efficiency of the vacuum cleaning arm.

The invention disclosed herein seeks to overcome one or more of the above identified problems or at least provide a useful alternative

SUMMARY

In accordance with a first broad aspect there is provided, an apparatus for vacuum cleaning a tank, the apparatus including a main body coupled to a working arm and a plurality of support legs coupled to the main body, wherein the main body includes a main conduit extending lengthwise therethrough and a common central actuator fitted about by the main conduit, and the working arm includes a vacuum conduit in fluid communication with the main conduit, wherein the plurality of support legs are operatively coupled to the common central actuator so as to be simultaneously moveable between a collapsed condition, in which the plurality of support legs are positioned alongside the main conduit so as to allow the main body to pass through an opening of the tank, and an extended condition in which the plurality of support legs are moved relatively outwardly so as to be telescopically extendable within the tank to engage a side wall of the tank to support the main body in a supported state.

In an aspect, each of the plurality of support legs are coupled to the main body at main body pivot points, and wherein the apparatus includes struts that extend respectively between the common central actuator and each of the plurality of support legs.

In another aspect, the common central actuator and struts are arranged to pivot each of the plurality of support legs about the main body pivot points to an over centre position relative to the main body pivot points in which the plurality of support legs are engagable with the tank in the extended condition.

In yet another aspect, a first end of the strut is pivotally coupled to the common central actuator via a central pivot arrangement and a second end of the struct is pivotally coupled to a respective one of the plurality of support legs at a position spaced apart from the main body pivot points.

In yet another aspect, each of the plurality of support legs includes an outer member and an inner member, the outer member being linearly telescopically extendable relative to the inner member to engage with the side wall of the tank.

In yet another aspect, each of the inner legs are pivotally coupled to the main body and are pivoted toward the side wall of the tank in the extended condition such that the outer legs engage with the side wall of the tank upon telescopic extension thereof.

In yet another aspect, each of the inner legs have respective proximate ends pivotally coupled to the main body, and wherein the apparatus includes struts that extend respectively between the common central actuator and each of the inner legs.

In yet another aspect, the common central actuator and struts are arranged to pivot the each of the inner legs to an over centre position supported by the struts.

In yet another aspect, each of the plurality of support legs includes a linear actuator substantially housed lengthwise along the respective inner legs, the linear actuator being adapted to telescopically extend and retract the outer legs.

In yet another aspect, the common central actuator is a hollow hydraulic cylinder type actuator.

In yet another aspect, each of the plurality of support legs are adapted to be individually linearly telescopically extendable to engage with the side wall of the tank.

In yet another aspect, each of the plurality of support legs are independently extendable such that the main body is laterally moveable within the tank in the supported state.

In yet another aspect, the main body includes a top adapted to be coupled with a support tether, a side toward which the plurality of support legs are position in the collapsed condition and an opposing bottom, the working arm being movably coupled to the bottom of the main body.

In yet another aspect, the vacuum conduit is coupled to a main conduit by a moveable vacuum swivel joint.

In yet another aspect, the vacuum swivel joint is adapted to allow the working arm to move in a range of motion including a rotational motion of about 360 degrees relative to a vertical axis and a pivotal motion between a lowered vertical position about in line with the vertical axis and a raised position angled at about 60 degrees relative to the vertical axis.

In yet another aspect, the vacuum swivel joint includes a housing and a movable conduit within the housing, the moveable conduit defining a passage between the vacuum conduit and the main vacuum conduit.

In yet another aspect, the housing and the movable conduit are arranged such that a cross sectional area of the passage is substantially maintained over the range of motion.

In yet another aspect, the housing includes a first aperture in fluid communication with the main conduit and a second elongate conduit that extends in a circumferential direction, and wherein the movable conduit is defined by an inner section moveable within the housing, the inner section including a first inner elongate aperture that extends in a circumferential direction in fluid communication with the first aperture of the housing and a second inner aperture that communicates with the vacuum conduit through the second elongate conduit of the housing.

In yet another aspect, the working arm is telescopically extendable thereby extending the vacuum conduit.

In yet another aspect, the working arm includes a plurality of concentrically arranged vacuum conduits that are telescopically extendable by an actuator coupled thereto.

In yet another aspect, a further actuator is coupled between the working arm and the vacuum swivel joint so as to move the working arm in the pivotal motion.

In yet another aspect, the apparatus being adapted to communicate with a remotely located controller adapted to allow remote control of the apparatus within the tank.

In yet another aspect, the apparatus includes one or more cameras.

In accordance with a second broad aspect there is provided, a system including an apparatus as defined in any one of the previous claims, and an external controller adapted to control the apparatus within the tank.

In an aspect, the system further includes a crane adapted to initially raise and lower the apparatus to an initial position within the tank.

In another aspect, the system further includes a launch cradle positionable at the opening of the tank.

In accordance with a third broad aspect there is provided, a method of supporting an apparatus within a tank, the method including: Passing a main body having a working arm of the apparatus through an opening of the tank with a plurality of support legs movably coupled to the main body in a collapsed condition; Pivoting the plurality of support legs toward a side wall of the tank to an over centre position relative to a pivot point between the plurality of support legs and the main body; Telescopically extending each of the plurality of support legs to an extended condition so as to engage the side wall thereby supporting the apparatus within the tank in a supported state.

In an aspect, the step of pivoting the plurality of support legs to over centre position includes moving a central actuator in an axial direction relative to a main condition thought the main body thereby moving struts arranged to pivotally couple the central actuator to each of the plurality of support legs.

In another aspect, the method includes, in the supported state, independently telescopically moving one or more of the plurality of support legs so as to adjust the lateral position of the main body within the tank.

In yet another aspect, the method includes, actuating a vacuum conduit carried by the working arm and communicated with a main conduit within the main body via a vacuum swivel joint in a range of motion including a rotational motion of about 360 degrees relative to a vertical axis and a pivotal motion between a lowered vertical position about in line with the vertical axis and a raised position angled at about 60 degrees relative to the vertical axis.

In yet another aspect, the method includes telescopically extending or retracting a vacuum conduit a carried by the working arm and communicated with a main conduit within the main body via a vacuum swivel joint.

In accordance with a fourth broad aspect there is provided, an apparatus for use within a tank, the apparatus including a main body coupled to a working arm and a plurality of support legs, the plurality of support legs being moveably coupled to the main body so as to be operatable between a collapsed condition, in which the plurality of support legs are positioned so as to allow the main body to pass through an opening of the tank, and an extended condition in which the plurality of support legs are extended within the tank so as to engage a side wall of the tank to support the main body within the tank in a supported state.

In accordance with a fifth broad aspect there is provided, an apparatus for vacuum cleaning a tank, the apparatus including a main body coupled to a vacuum conduit and a plurality of support legs coupled to the main body, wherein the main body includes a main conduit extending lengthwise therethrough and a common central actuator fitted about by the main conduit, and wherein the vacuum conduit is communication with the main conduit via a vacuum swivel joint, wherein the plurality of support legs are operatively coupled to the common central actuator so as to be simultaneously moveable between a collapsed condition, in which the plurality of support legs are positioned alongside the main conduit so as to allow the main body to pass through an opening of the tank, and an extended condition in which the plurality of support legs are telescopically extended within the tank so as to engage a side wall of the tank to support the main body within the tank in a supported state, and wherein the vacuum swivel joint is adapted to allow the vacuum conduit to move in a range of motion including a rotational motion of about 360 degrees relative to a vertical axis and a pivotal motion between a lowered position and a raised position.

In an aspect, the vacuum swivel joint includes a housing and a movable conduit within the housing, the moveable conduit defining a passage between the vacuum conduit and the main vacuum conduit.

In accordance with a sixth broad aspect there is provided, an apparatus for vacuum cleaning a tank, the apparatus including a main body coupled to a working arm and a plurality of support legs coupled to the main body at a main body pivot points, wherein the main body includes a main conduit extending lengthwise therethrough and a common central actuator fitted about by the main conduit, and the working arm includes a vacuum conduit in fluid communication with the main conduit, wherein each of plurality of support legs are operatively coupled to the common central actuator by respective structs so as to be simultaneously moveable between a collapsed condition, an intermediate condition, and extended condition, wherein in the collapsed condition the plurality of support legs are positioned alongside the main conduit in a retracted state so as to allow the main body to pass through an opening of the tank, in the intermediate condition the struts support the plurality of support legs in an over centre position relative to the main body pivot points, and in the extended condition in which the plurality of support legs are telescopically extended to an extended state within the tank so as to engage a side wall of the tank to support the main body within the tank in a supported state.

In accordance with a seventh broad aspect there is provided, a method of supporting an apparatus relative to a tank, the method including: in a first in-use condition, fitting a main body having a working arm of the apparatus at least partially through an opening of the tank and moving a plurality of support legs in a retracted state to bear on the opening of the tank thereby supporting the apparatus; and in a second in-use condition, passing the main body through the opening, pivoting the plurality of support legs toward a side wall of the tank and telescopically extending each of the plurality of support legs to an extended condition so as to engage the side wall thereby supporting the apparatus within the tank in a supported state.

BRIEF DESCRIPTION OF THE DRAWINGS

The invention is described, by way of non-limiting example only, by reference to the accompanying figures, in which;

FIG. 8b is a detailed view illustrating detail B as indicated in FIG. 8a;

DETAILED DESCRIPTION

Figure 12A:
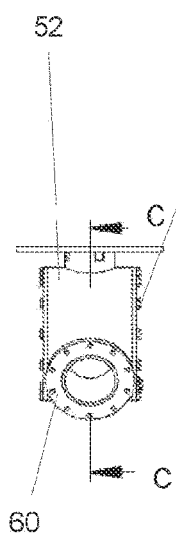
FIGS. 12a to 12d illustrate, respectively, a front view, a side view, a sectional view along section C-C and side sectional view along section D-D of a vacuum swivel joint of the apparatus.
Figure 12B:
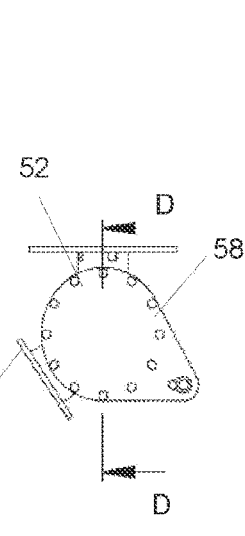
Figure 12C:
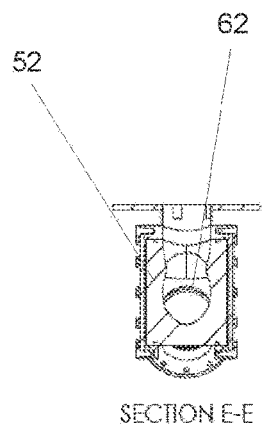
Figure 12D:
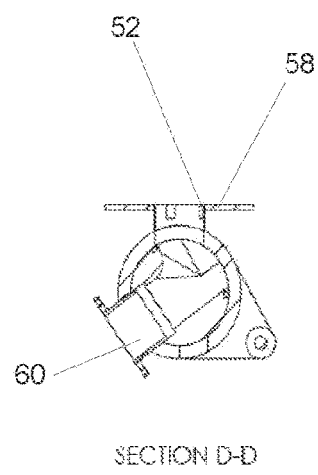
Figure 12E:
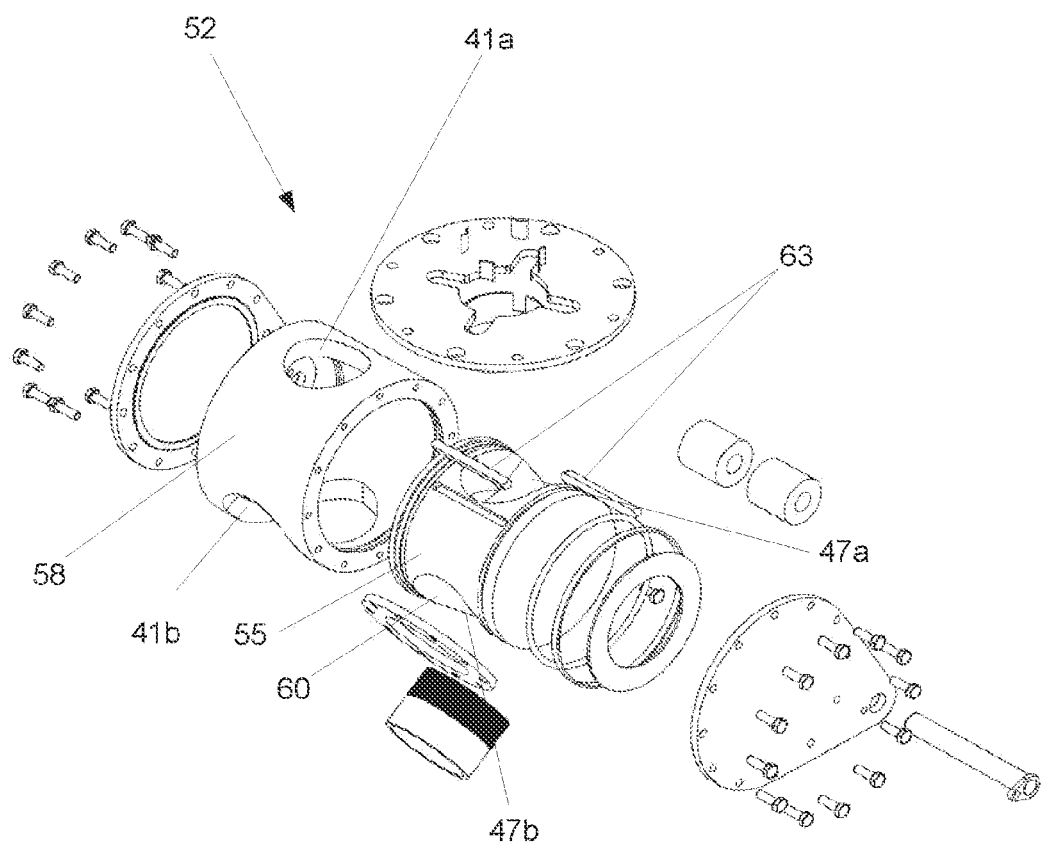
FIG. 12e is an exploded parts view illustrating the vacuum swivel joint of the apparatus.
Figure 13:
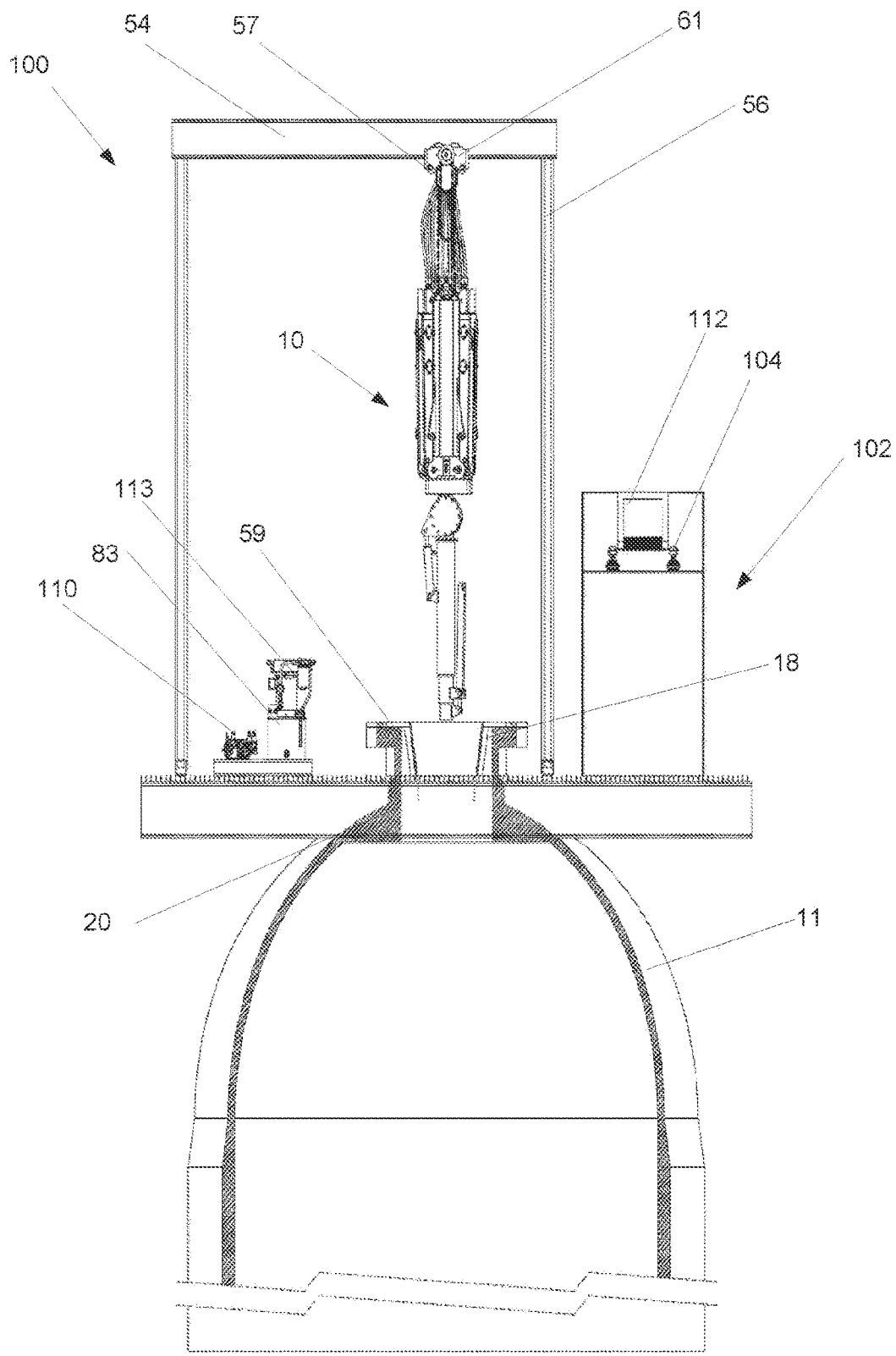
FIG. 13 illustrates an example of a system including the apparatus having a crane and a launching support cradle in a pre-launch position.

Referring to FIGS. 1 to 13 there is shown an apparatus 10 for use within a tank 11 (an example tank 11 is shown in FIG. 13). The apparatus 10 includes a main body 12 coupled to a working arm 14 and a plurality of support legs 16. It is noted that whilst this example illustrates a tank, the apparatus may be used with various types of confined spaces such as pipes, ducts, shafts, tunnels and other types of vessels, and is not limited to use only with a tank.

Figure 1:
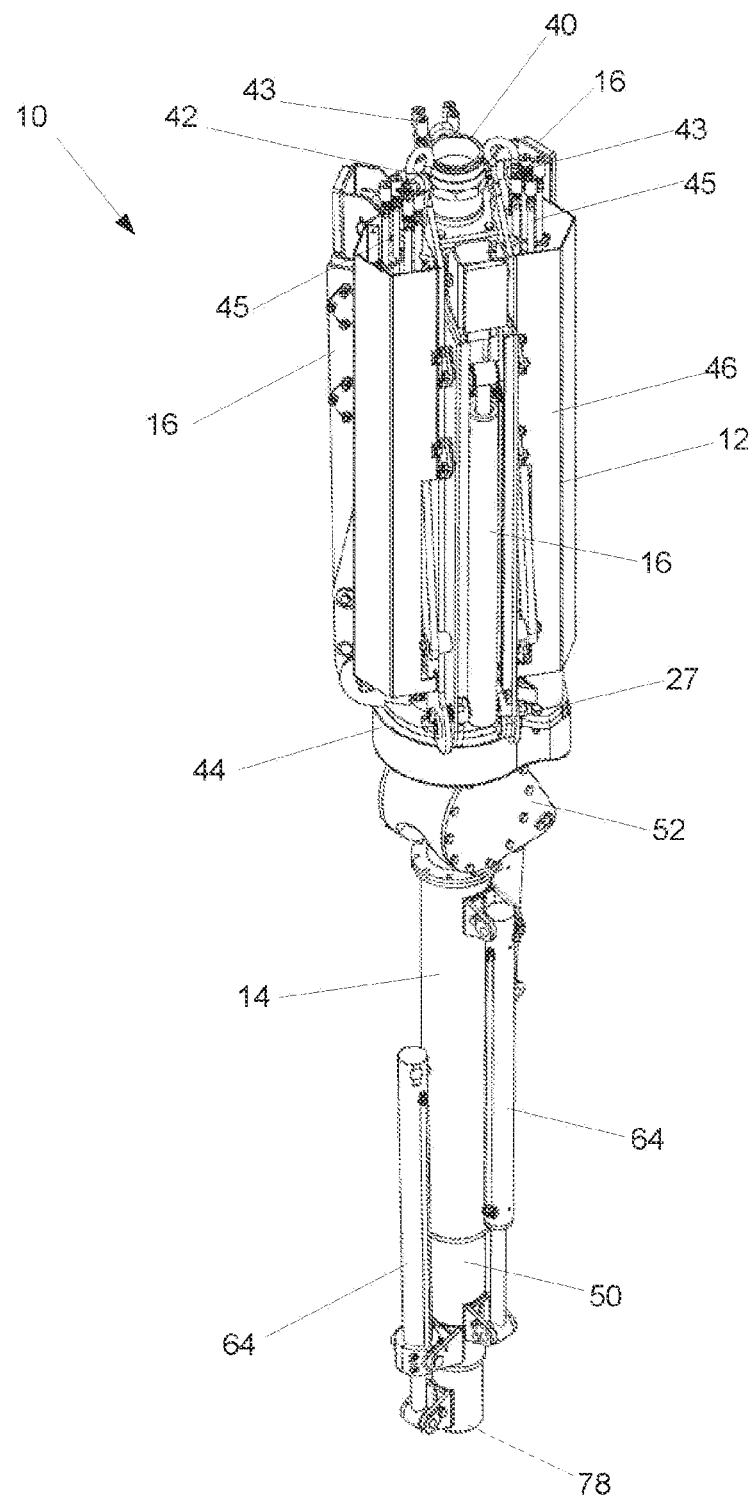
FIG. 1 is a side perspective view of an apparatus for use within a tank in a collapsed condition.
Figure 2:
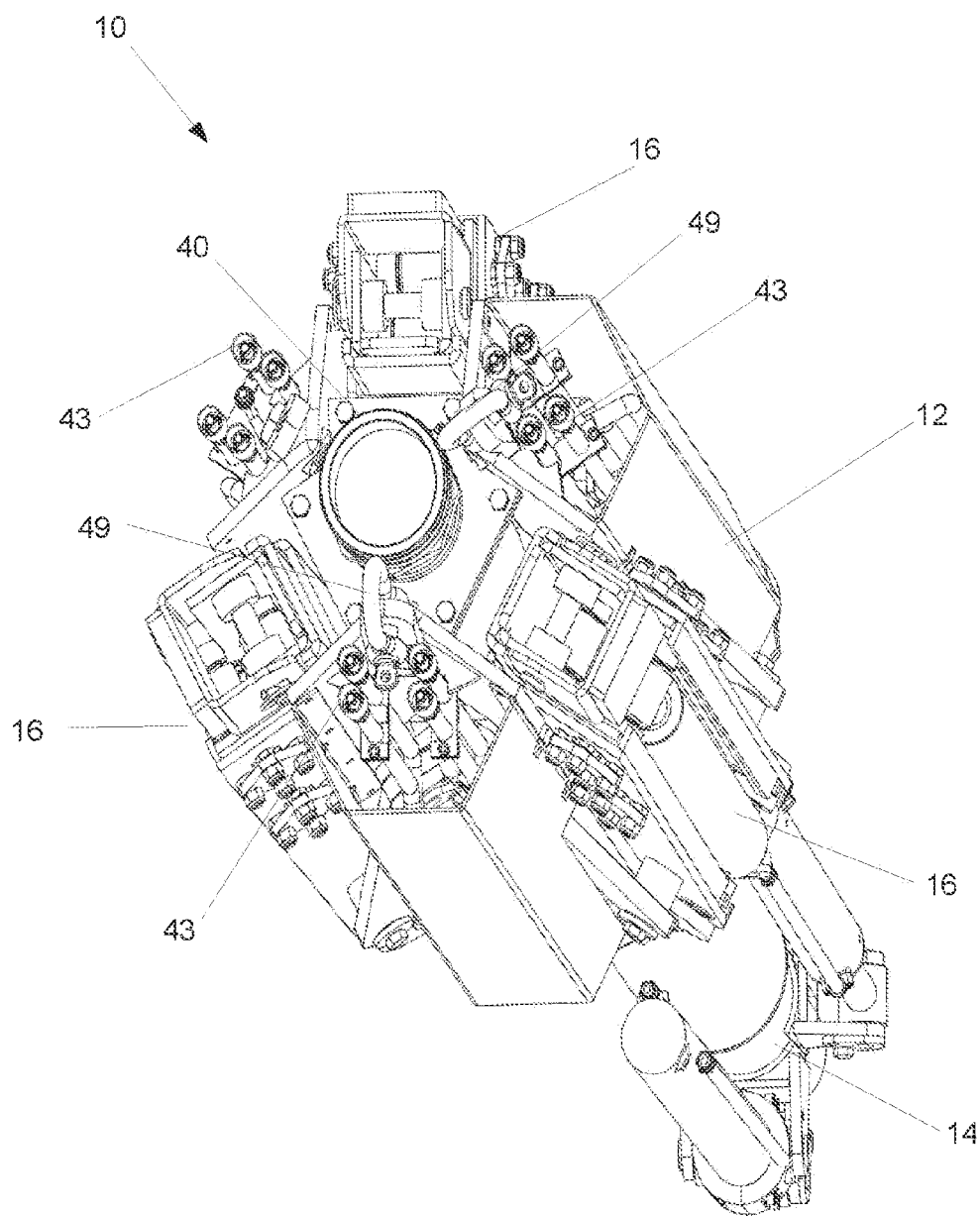
FIG. 2 is a top perspective view of the apparatus.
Figure 9:
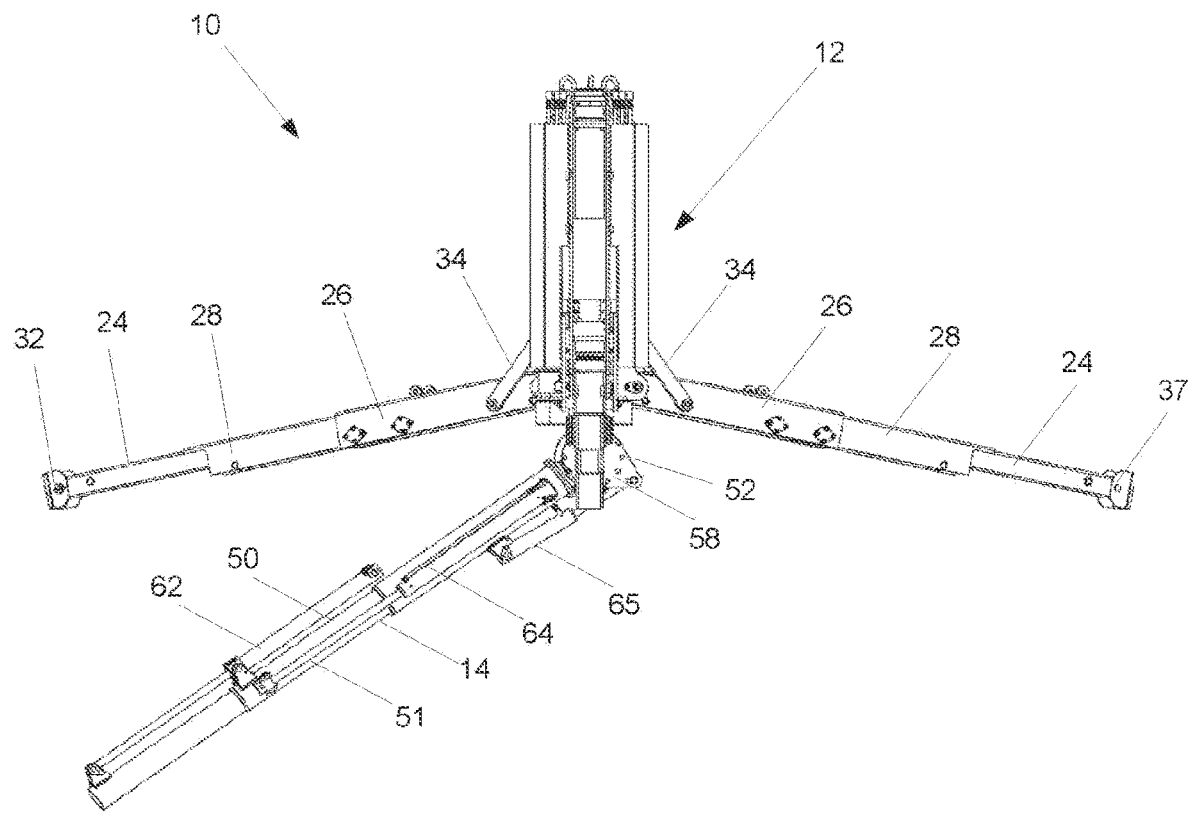
FIG. 9 is a side view illustrating the apparatus with the plurality of support legs in the extended condition and the working arm in an extended condition.
Figure 10:
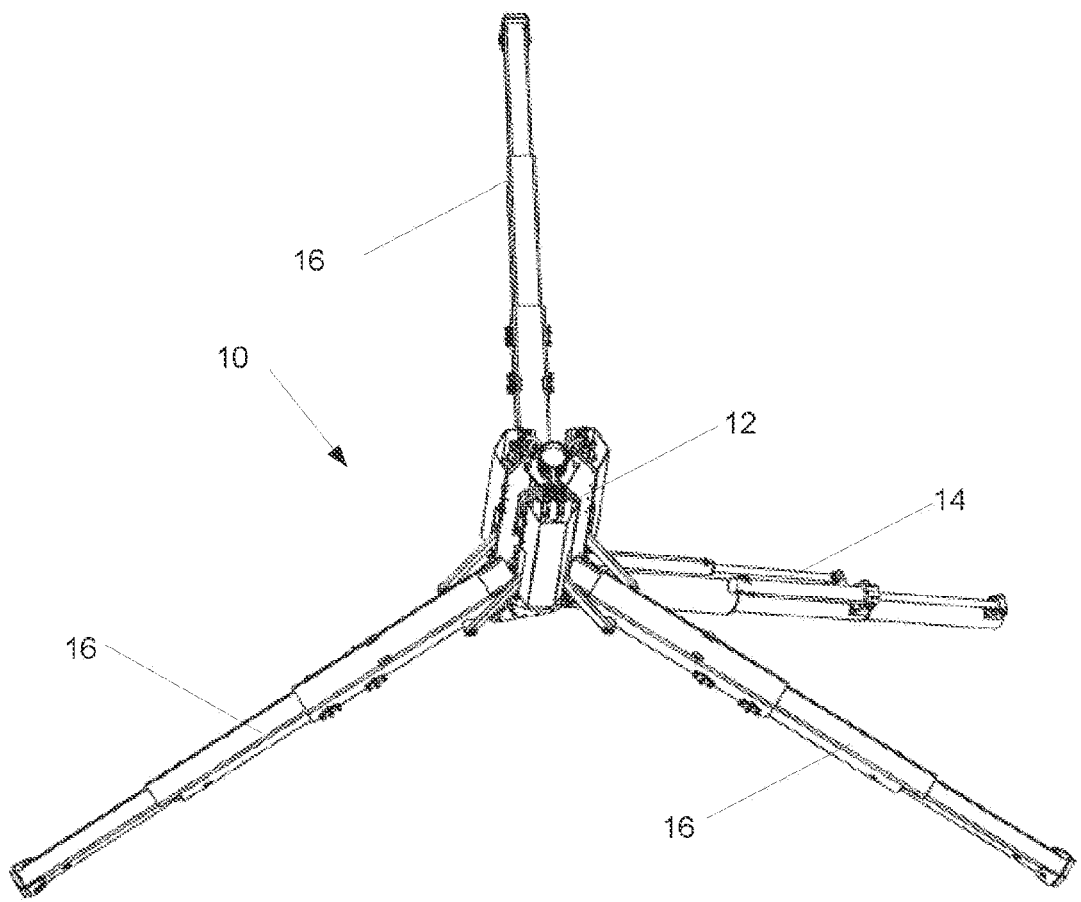
FIG. 10 is a top perspective view illustrating the apparatus with the plurality of support legs in the extended condition.
Figure 11:
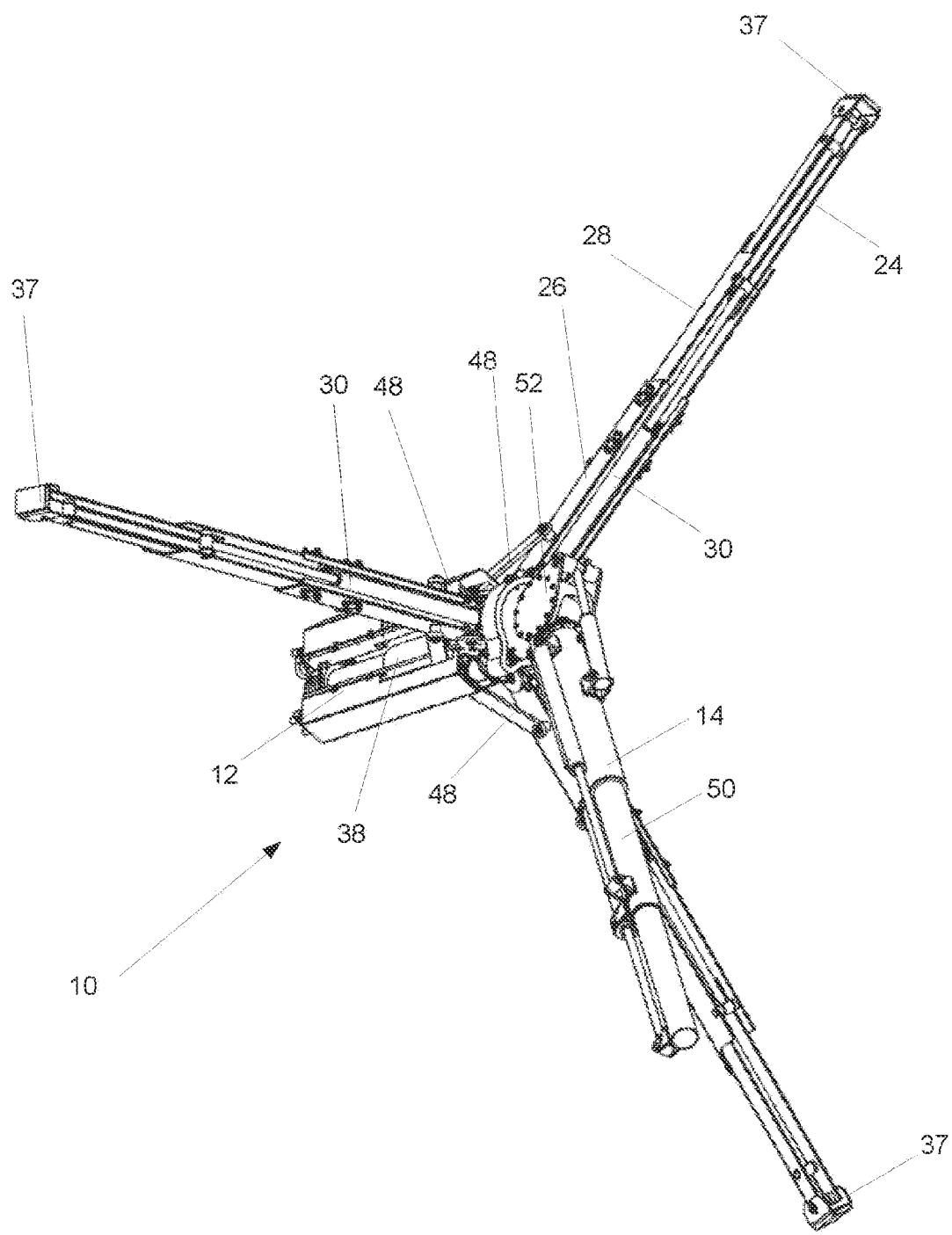
FIG. 11 is an underside perspective view illustrating the apparatus with the plurality of support legs in the extended condition.

The plurality of support legs 16 are moveably coupled to the main body 12 so as to be operable between a collapsed condition, as shown for example, in FIG. 2, in which the plurality of support legs 16 are in a retracted state positioned proximate the main body 12 so as to allow the main body 12 to pass through an opening 18 of the tank 11, and an extended condition, as shown for example in FIG. 9, in which the plurality of support legs 12 are extended within the tank 12 to an extended state so as to engage a side wall 20 of the tank 11 to support the main body 12 within the tank 11 in a supported state.

The apparatus 10 may be provided as part of a system 100 adapted to allow remote control of the apparatus 10 within the tank 11, as is further detailed below with reference to FIGS. 13 to 17

Figures 4, 5:
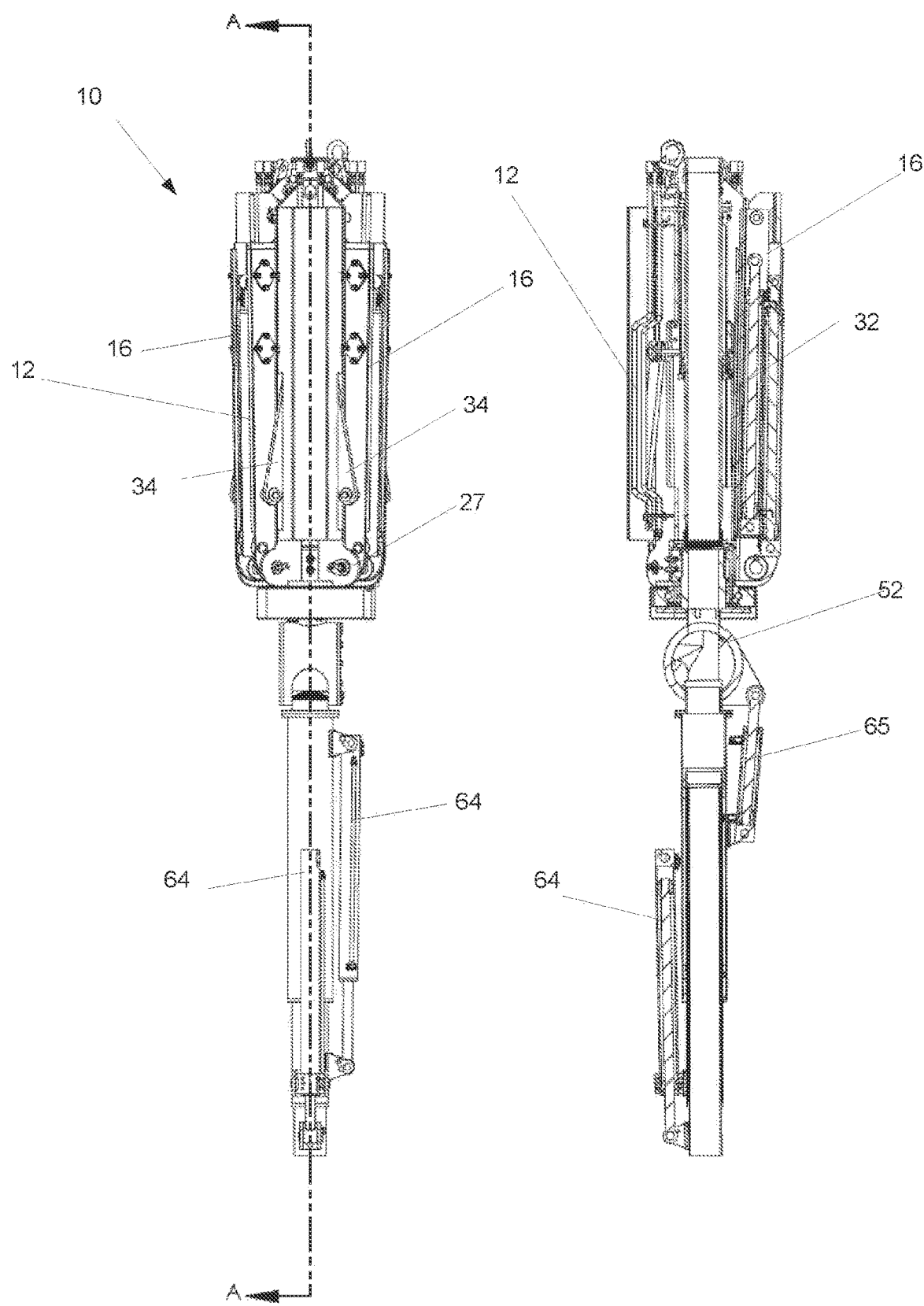
FIG. 4 is a side view illustrating the apparatus.
FIG. 5 is a side sectional view illustrating the apparatus along section A-A as shown in FIG. 4.

In more detail, as best shown in FIGS. 5 and 9, the plurality of support legs 16 each include a plurality of telescopically arranged members 22 including an outer member 24 adapted to engage with the tank side wall 20, an inner member 26 coupled to the main body 12, and an intermediate member 28. The telescopically arranged members 22 are channel shaped and the inner member 26 substantially houses a leg linear actuator 30, and the outer member 24 and intermediate member 28 nest within the inner member 26 in the retracted collapsed condition. The leg linear actuator 30 is controllable to telescopically individually control the extension and retraction of each of the plurality of support legs 16.

The inner member 26 of each of the plurality of support legs 16 is pivotally coupled to the main body 12 at main body pivot points 27. The main body 12 includes a central arrangement 31 having a central actuator 32 that is coupled to each of the inner members 26 by a leg linkage arrangement 34 such that the central actuator 32 controls the movement of the plurality of support legs 16 between the collapsed condition alongside the main body 12 and simultaneously pivots each of the plurality of support legs 16 toward the extended condition prior to the plurality of telescopically arranged members 22 being telescopically extended.

The outer member 24 includes a foot 36 that us arranged to bear against the side wall 20 of the tank 10 in the extended condition. The force of the plurality of support legs 16 thereby supporting the weight of the main body 12 within the tank 12 in the supported state. The feet 36 may include pivoting pads 37 that engage with the tank side wall 20.

Advantageously, because each of the plurality of support legs 16 pivots toward the extended position and then independently telescopically extend and retract, the plurality of support legs 16 are able to laterally move the main body 12 within the tank 11. So, for example, if the tank opening is to one side of the tank, the plurality of support legs 16 may be actuated to move the main body 12 toward the centre axis of the tank 11. Further, this lateral movement may be accomplished whilst the lateral force is maintained against the tank 11 thereby maintaining the main body 12 in the supported state.

The main body 12 includes a top section 42, a bottom section 44 and an elongate generally round intermediate section 46 extending between the top section 42 and the bottom section 44. The top section 42 is adapted to be coupled to a tether 54 and ultimately a crane 56, as shown in FIG. 13. In this example, the top section 42 includes one or more lifting points 49 that may be coupled to the tether 54, in use.

The top section 42 also includes a plurality of actuator connections 43 to provide hydraulic fluids via hydraulic lines 45 to the respective actuators such as the leg actuator 30 and the main central leg tilt actuator 32. The hydraulic lines couple with an external hydraulic pressure source 83 located outside of and away from the apparatus 10 and tank 11. The bottom section 44 is adapted to be coupled with the working arm 14. Overall, the main body 12 is relatively slender in the collapsed condition so as to fit through the tank opening 18.

Figure 16:
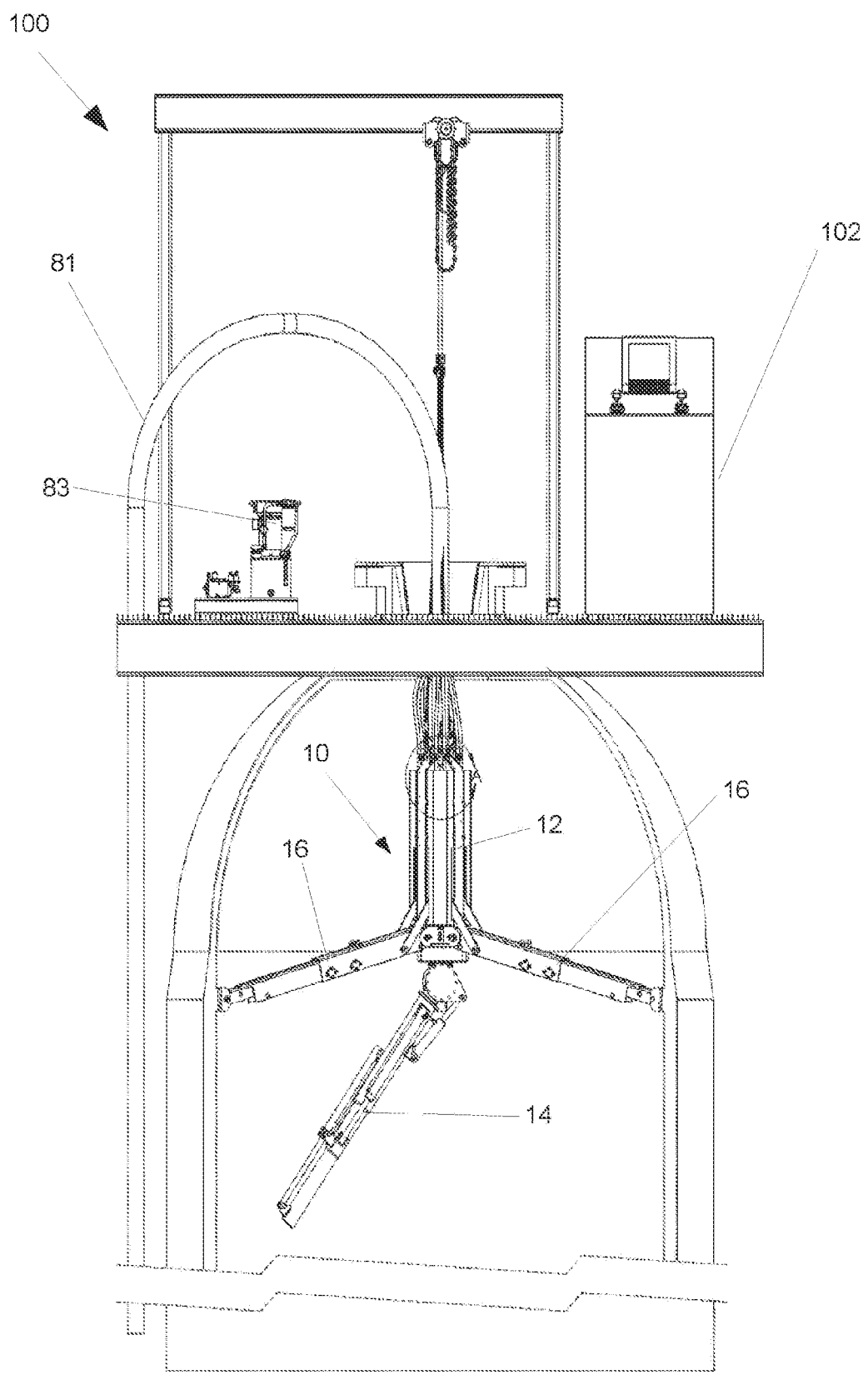
FIG. 16 illustrates a side view of the system including the apparatus having the crane and the launch support cradle in the second in-use condition.

In this example, the apparatus 10 is preferably adapted to vacuum an inside of the tank 11. As such, the main body 12 includes a main conduit 40 extending in a lengthwise axial direction between the top section 42 and the bottom section 44. The main conduit 40 may be coupled toward the top section 42 to a vacuum suction line 81 (as shown in FIG. 16).

As best shown in FIGS. 8*a* to 8*e*, the leg linkage arrangement 34 includes strut members 48 that extend between each of the inner members 26 and a central collar 38. More specifically, the strut members 48 extend between a pivot point 29 of the inner members 26 of each of the plurality of support legs 16 and a central pivot arrangement 39 coupled to the central collar 38.

The central collar 38 is moved by the central actuator 32 in an axial direction relative to the central conduit 40. The central collar 48 thereby moves the strut member 48 which in turn moves the plurality of support legs 16 between the stowed condition and an intermediate lowered condition, prior to the plurality of support legs 16 being extended. The central collar 38 is clamped to an outer cylinder 32*a* of the central actuator 32 that moves relative to an inner cylinder 32*b* of the central actuator 32. The inner cylinder 32*b* being fixed to the central conduit 40. A central pivot arrangement 39 is attached to the central collar 38 to which each of the strut members 48 pivotally couple. In this example, the central actuator 32 is a hollow type cylindrical hydraulic actuator.

It noted that in the intermediate lowered condition, the arrangement is such that the plurality of support legs 16 are in an over centre position or state relative to the pivot point 27. This ensures that the force applied during extension of the legs 16 is carried mostly through the pivot point 27 with the strut members 48 in tension as opposed to compression which may then place force onto the central actuator 32. It is preferable that the over centre position or state is reached before the plurality of support legs 16 are fully extended to engage with the tank 11. This allows the actuator force of the plurality of support legs 16 to increased thereby improving the ability to support the apparatus 10 within the tank 11 and also the loads/forces that may be applied to the apparatus 10.

In this example, as best shown in FIG. 9, the working arm 14 is adapted to provide a vacuum arm or boom 51 and includes a plurality of telescopic vacuum conduits 50 that are arranged in fluid communication with the main conduit 40 via a vacuum swivel joint or knuckle 52. The vacuum arm or boom 51 is adapted to be able to remove and reload catalyst or other free flowing products from within the tank 11.

However, it is noted that the working arm 14 may take a variety of forms such as a robotic arm for tasks, a high-pressure hose, a support boom to carry a load, a camera boom for inspection or X-Ray, or adapted to hold tools such as those for buffing or grinding. Accordingly, the working arm 14 may be interchangeable to provide different functionalities. Accordingly, the working arm 14 is not limited to a vacuum arm or boom 51 as shown herein and may take other forms in alternative examples.

The vacuum swivel joint 52 is adapted to allow the working arm 14 to move in a range of motion including a rotational motion of about 360 degrees relative to a vertical axis and a pivotal motion between a lowered vertical position about in line with the vertical axis and a raised position angled at about 60 degrees relative to the vertical axis.

The plurality of telescopic vacuum conduits 50 are extendable and retractable via two vacuum conduit extension actuators 64 and are tilted via a vacuum conduit tilt actuator 65. The vacuum conduit extension actuator 64 is coupled alongside the plurality of telescopic vacuum conduits 50 and the vacuum conduit tilt actuator 65 is coupled between the plurality of telescopic vacuum conduits 50 and a housing 58 of the vacuum swivel joint 52 that provides a relatively static attachment point.

As best shown in FIGS. 12*a* to 12*e*, the vacuum swivel joint 52 includes a housing 58 and a transition conduit 60 within the housing 58. The transition conduit 60 defines a passage 62 between the plurality to telescopic vacuum conduits 50 and the main conduit 40 within the main body 12. Advantageously, the housing 58 and the transition conduit 60 are arranged such that a cross sectional area of the passage 62 is substantially maintained over the range of motion without reducing, pinching or the like. This allows vacuum suction to be substantially maintained across the above-mentioned range of motions.

In more detail, as best shown in FIGS. 12*d* and 12*e*, the vacuum swivel joint 52 includes a cylindrically shaped inner section 55 that moveably fits within the housing 58. The inner section 55 includes a first aperture 47*a* that is elongate and extends in a circumferential direction about the inner section 55 and a second aperture 47*b* that is circular. The housing 58 includes a first circular aperture 41*a* and a second aperture 41*b* that is elongate and extends in a circumferential direction about the housing 58. The circumferential lengths of the elongate apertures 41*b* and 47*a* define the available pitch of travel of the vacuum swivel joint 52. Seals 63 are provided to seal the first aperture 47*a* with the housing 58 as it moves therein.

Figure 3:
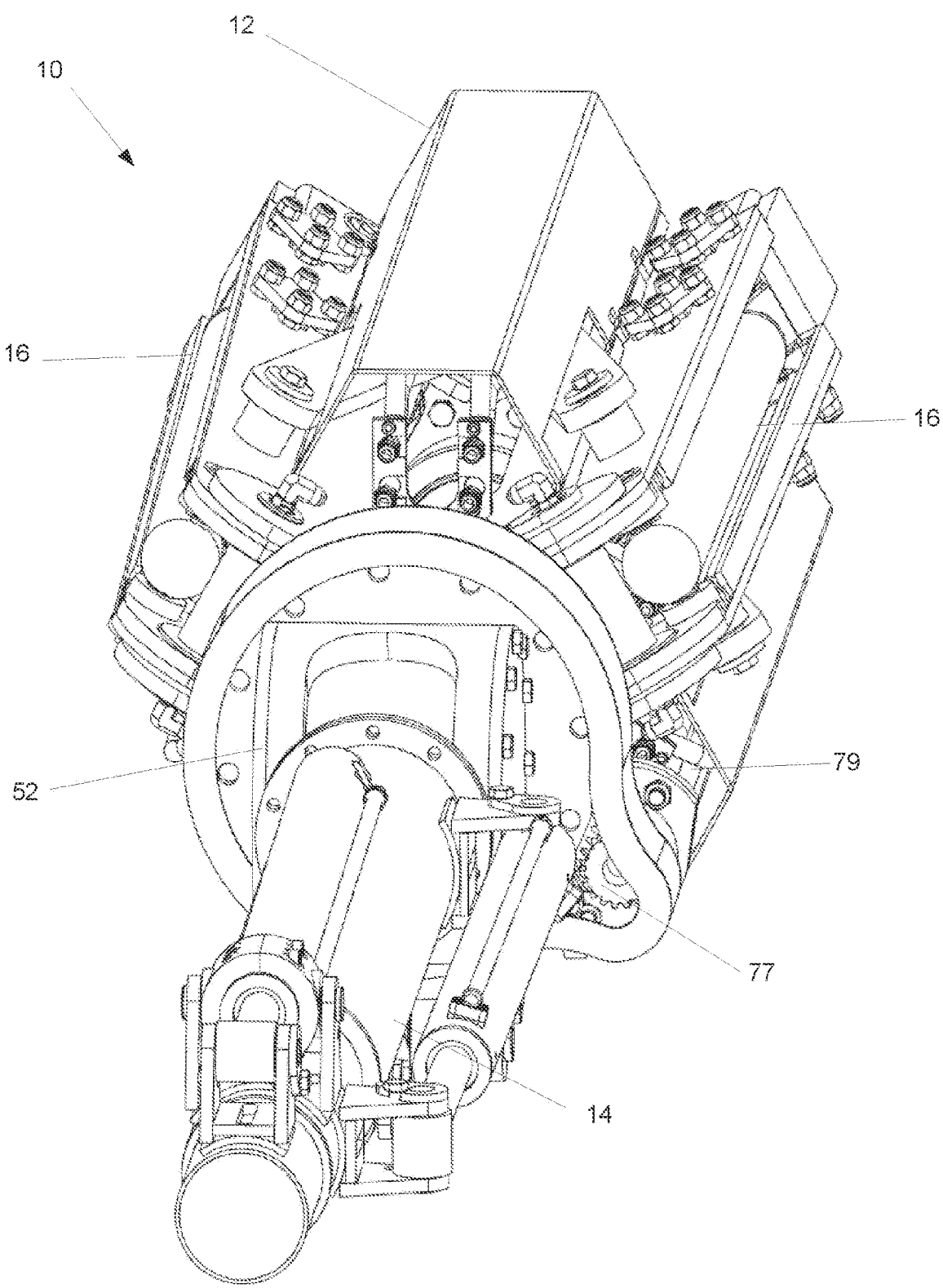
FIG. 3 is a bottom perspective view illustrating the apparatus.
Figure 6:
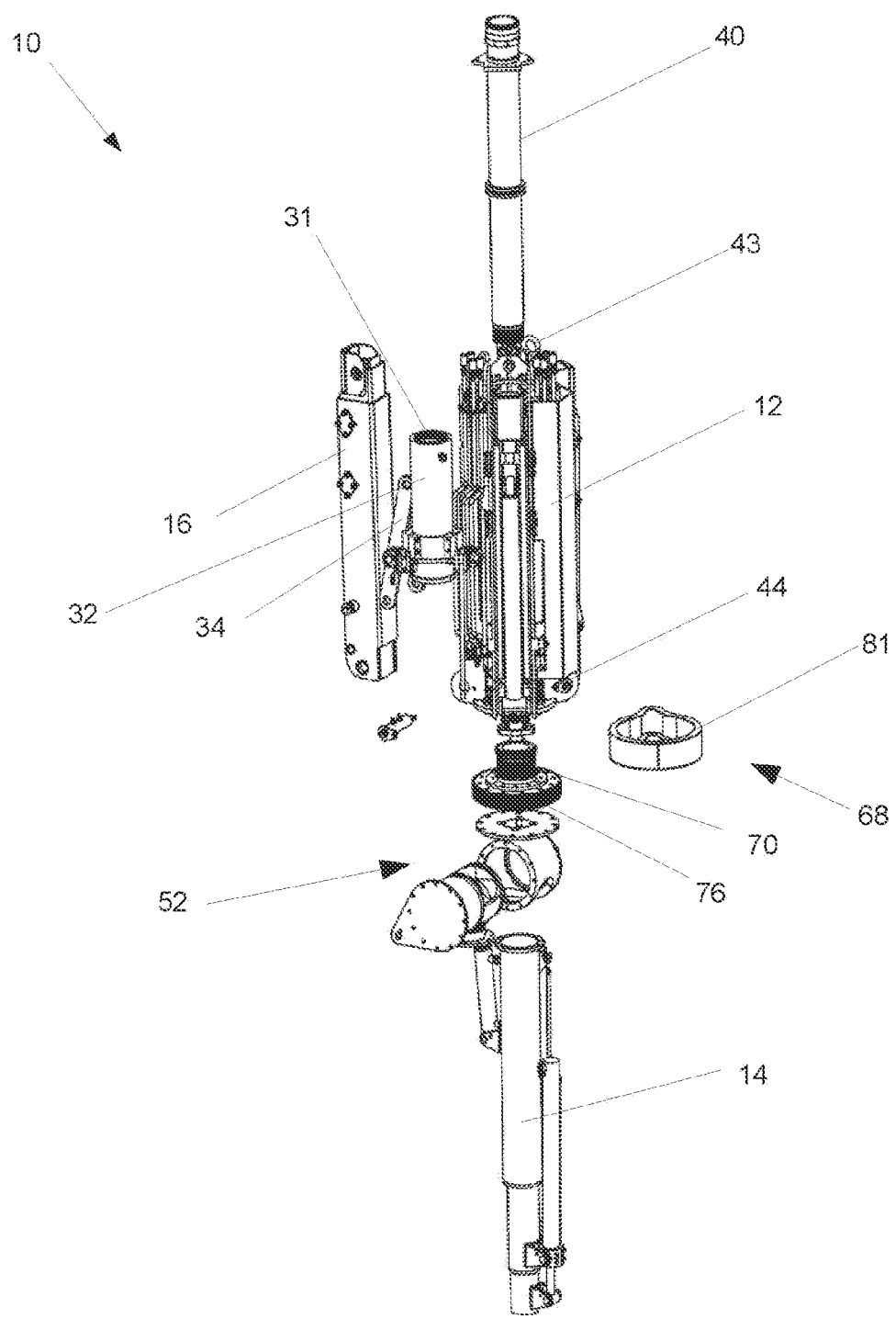
FIG. 6 is an exploded parts perspective view illustrating the apparatus.
Figure 7:
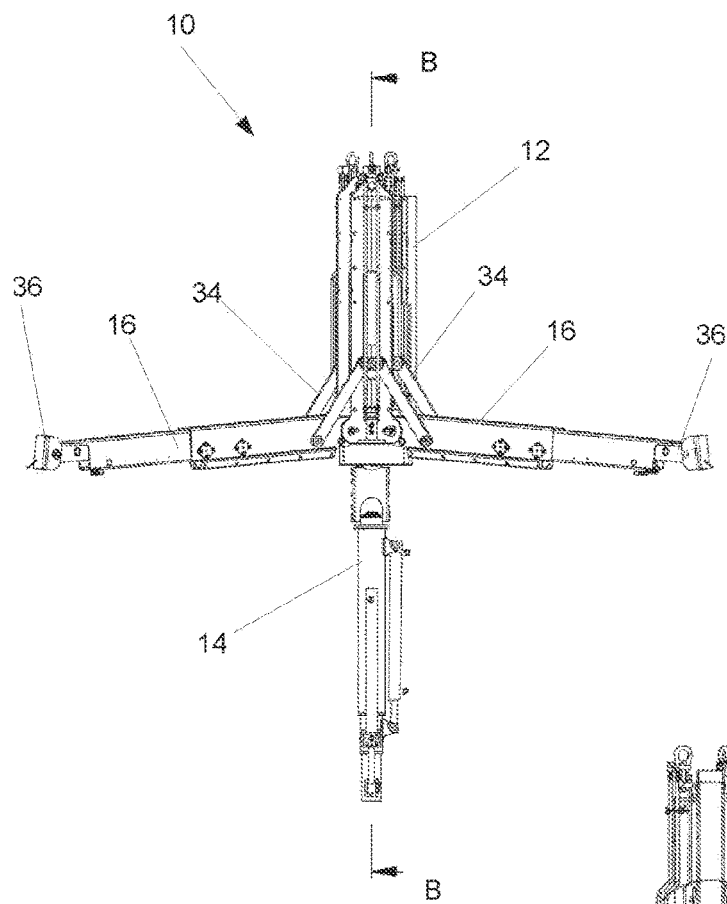
FIG. 7 is a side view illustrating the apparatus with a plurality of support legs outwardly pivoted in a retracted state prior to the plurality of support legs being extended to an extended condition.
Figure 8A:
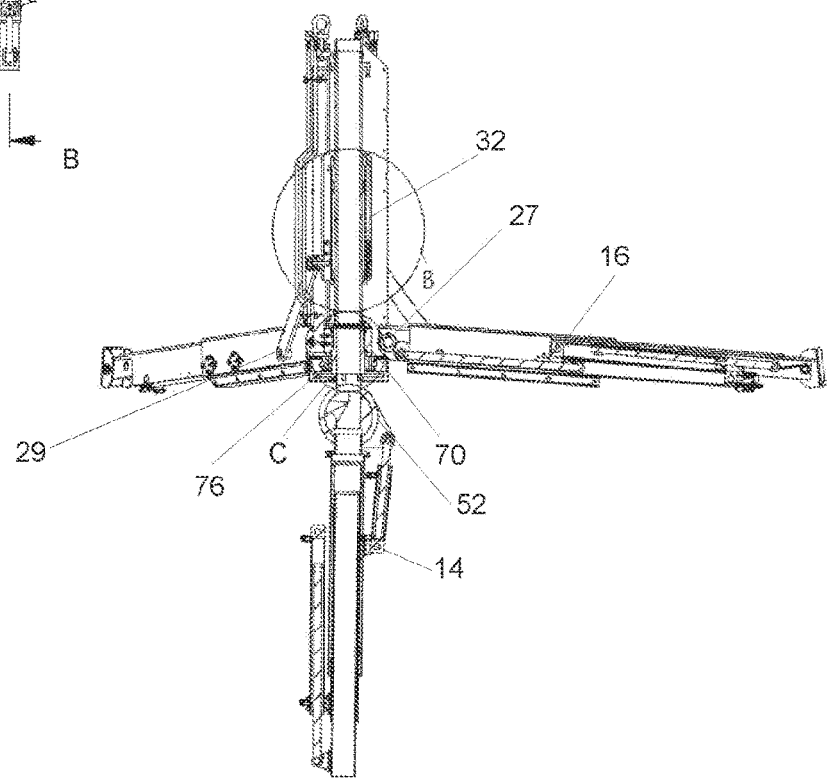
FIG. 8a is a side sectional view illustrating the apparatus along section B-B as indicated in FIG. 7 with the plurality of support legs pivoted toward the extended condition.
Figure 8B:
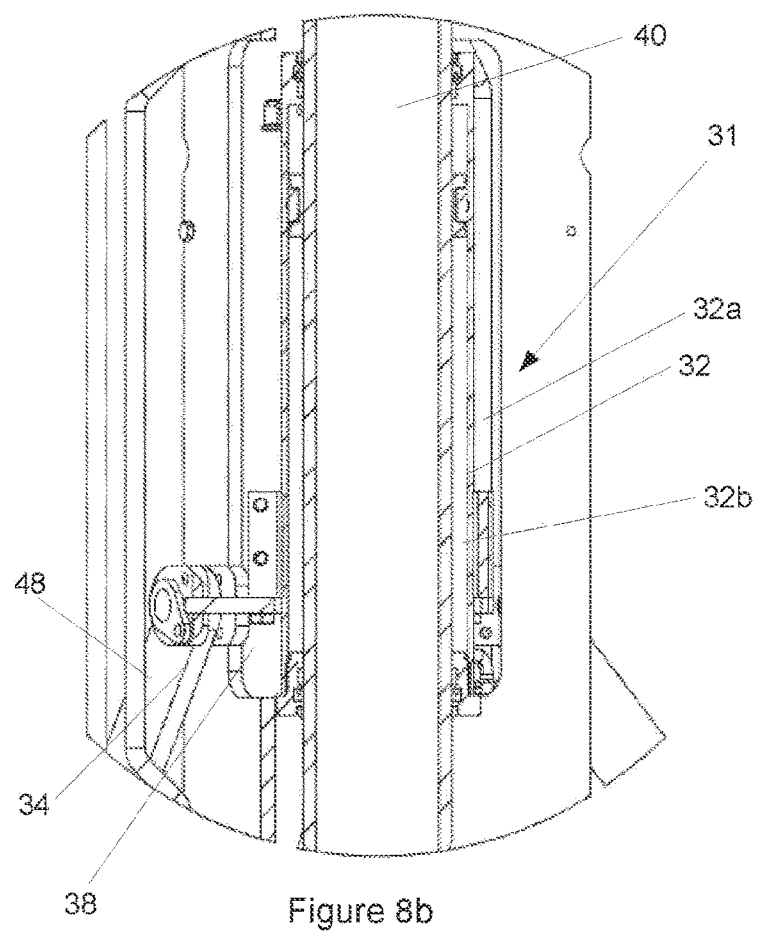
Figure 8C:
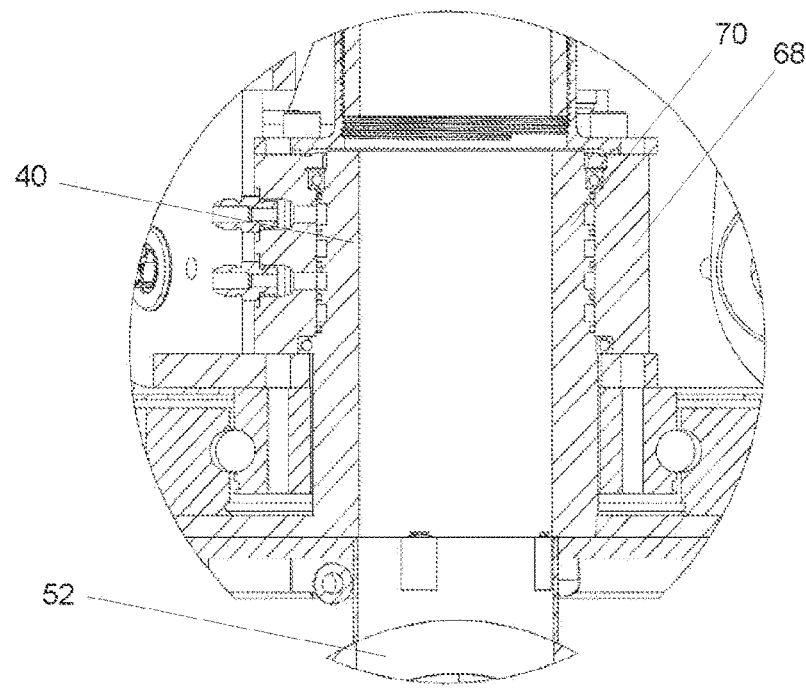
FIG. 8c is a detailed view illustrating detail C as indicated in FIG. 8b.
Figures 8D, 8E:
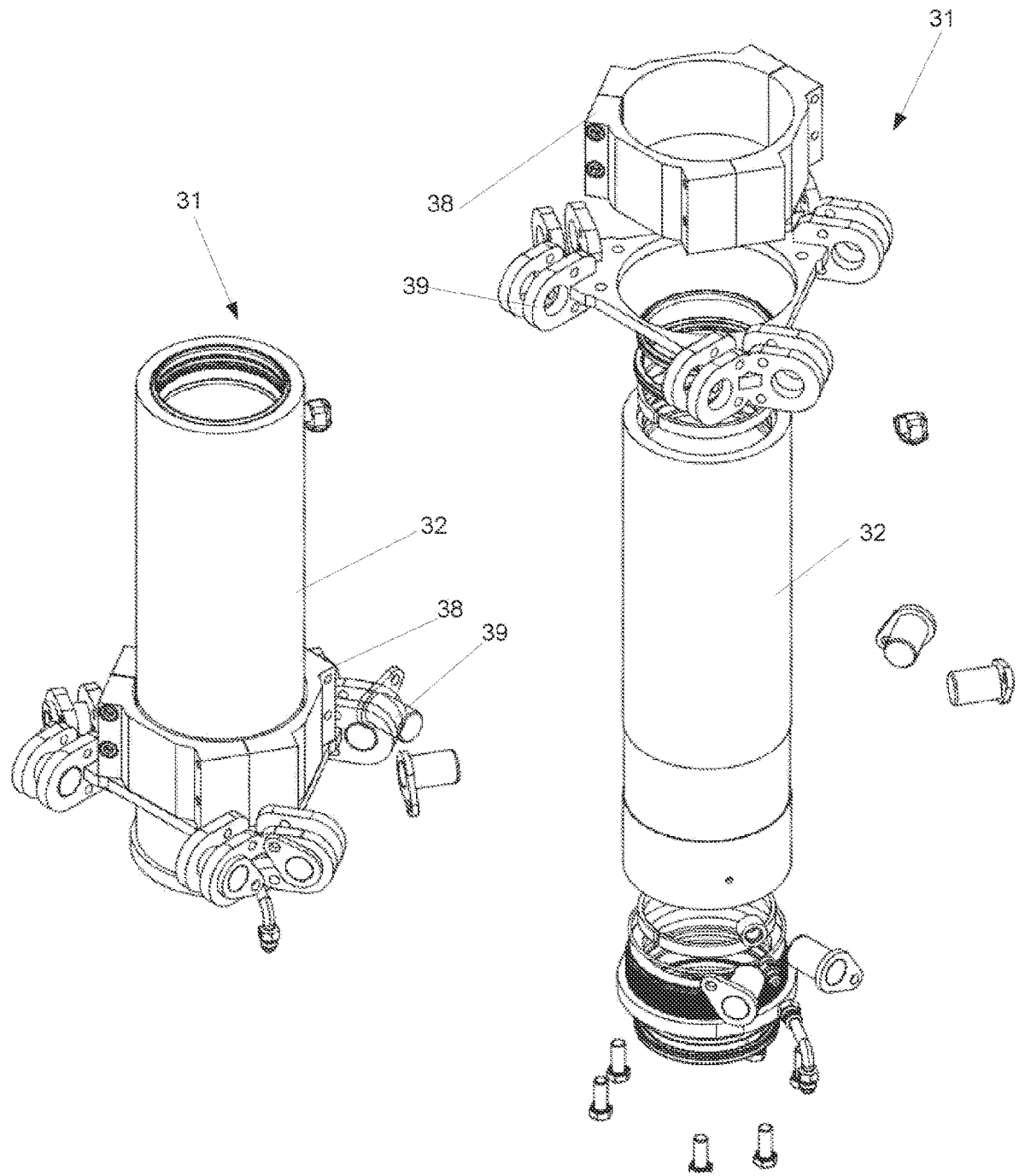
FIG. 8d is a perspective view of a central actuator arrangement of the apparatus.
FIG. 8e is an exploded parts perspective view of the central actuator arrangement.

Referring to FIGS. 6 and 8*c*, a rotatable coupling arrangement 68 is provided between the vacuum swivel joint 52 and the bottom section 44 of the main body 12. The rotatable coupling arrangement 68 includes a rotary union joint 70, slew ring bearing 76 and a skirting fixed collar 81. The bearing 76 may be adapted to be driven by a sprocket 77 that is driven by a rotating hydraulic motor 79 as shown in FIG. 3. The rotating hydraulic motor 79 controls the 360-degree rotation of the working arm 14.

The rotatable coupling arrangement 68 allows for sealed rotational coupling of the vacuum swivel joint 52 and the main conduit 40. The slew ring 76 incorporates the rotary union joint 70 to maintain hydraulics to the vacuum arm 51 throughout continuous rotation and above that may be provided a slip ring (not shown) to allow for continuous power and signal through the rotating slew ring 76 for electrical connections for lights, camera and remote control.

The free end 78 of the telescopic vacuum conduits 50 may be therefore positioned to apply a suction force to material or fluid within the tank 11 for cleaning or maintenance purposes. The vacuum may also be reversible and the telescopic vacuum conduits 50 may be used to deposit a material or liquid within the tank 11 such as a granular catalyst material. In other examples in which the working arm 14 is provided in other forms, the working arm may be used for various purposes such as holding a camera or tool, or hose for pressure washing.

Referring additionally to FIGS. 13 to 17, the apparatus 10 may be provided as part of a system 100 including an external control unit 102 adapted to control the apparatus within the tank 11 and the crane 56 having a gantry 57 and winch 61 adapted to initially raise and lower the apparatus to an initial position within the tank 11 via the tether 54. The system 100 also may include a launch cradle 59 fitted to the tank opening 18 to guide the passage of the apparatus 10 and also protect the tank opening 18. It is noted that the apparatus 10 may be located in a position in which the plurality of support legs 16 are engaged with the launch cradle 59 which allows the working arm 14 access to the top portion of the tank 11.

Figure 17:
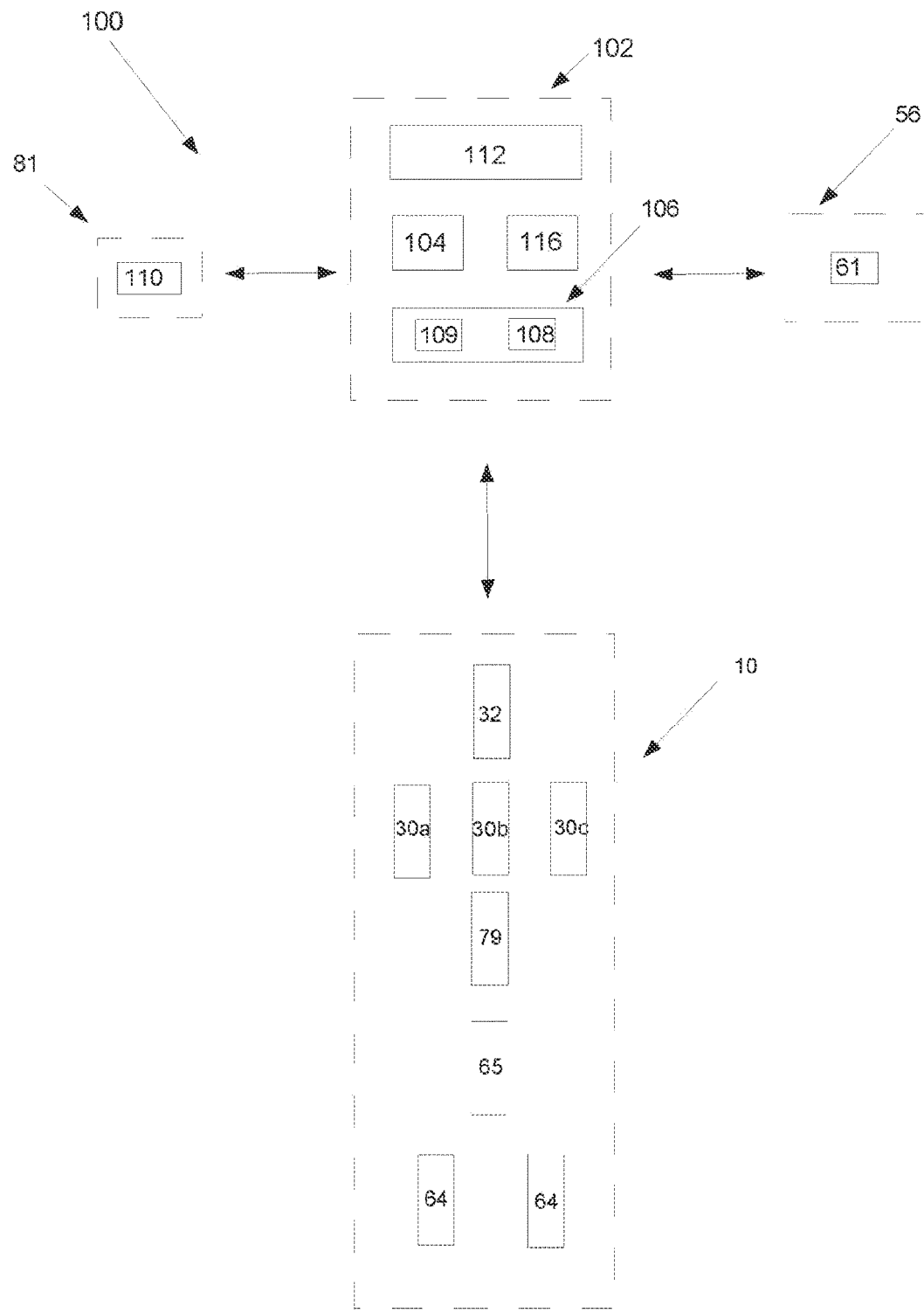
FIG. 17 is a system block diagram illustrating an example of a system to operate the apparatus within the tank.

Referring more specifically to FIG. 17, the external control unit 102 may include a hand operable user input 104 such as a joystick, a controller 106 including a processor 108 and memory 109 and hydraulic control valves 110 that are configured by the controller 106 to operate the respective actuators (30, 32, 64, 66 etc) of the apparatus 10 in response to input from the user.

It is also possible that in some examples, the controller 106 may be configured for autonomous operation with minimal or no user input. The hydraulic control valves 110 relay the appropriate hydraulic fluid pressures for the hydraulic pressure source 83 that may include a pump 113 to the respective actuators (30, 32, 64, 68 etc) via hydraulic control lines coupled to the apparatus 10. The external control unit 102 may also include a screen 112 to display a recorded image within the tank by one or more cameras (not shown) fitted to the main body 12 and/or working arm 14. The main body 12 and/or working arm 14 may also include one or more lights (not shown) to illuminate the tank 11 operatable via a switch 116 at the external control unit 102. The external control unit 102 may also control a winch 61 of the crane 56.

Turning now to a method of use, system 100 is initially arranged with a gantry 57 of the crane 56 over the opening 20 of the tank 11. The main body 12 of the apparatus 10 is suspended by the tether 54 and seated into the launch cradle 59. The working arm 14 is generally downwardly vertically aligned and the plurality of support legs 16 are in the retracted condition alongside the main body 12.

Figure 14:
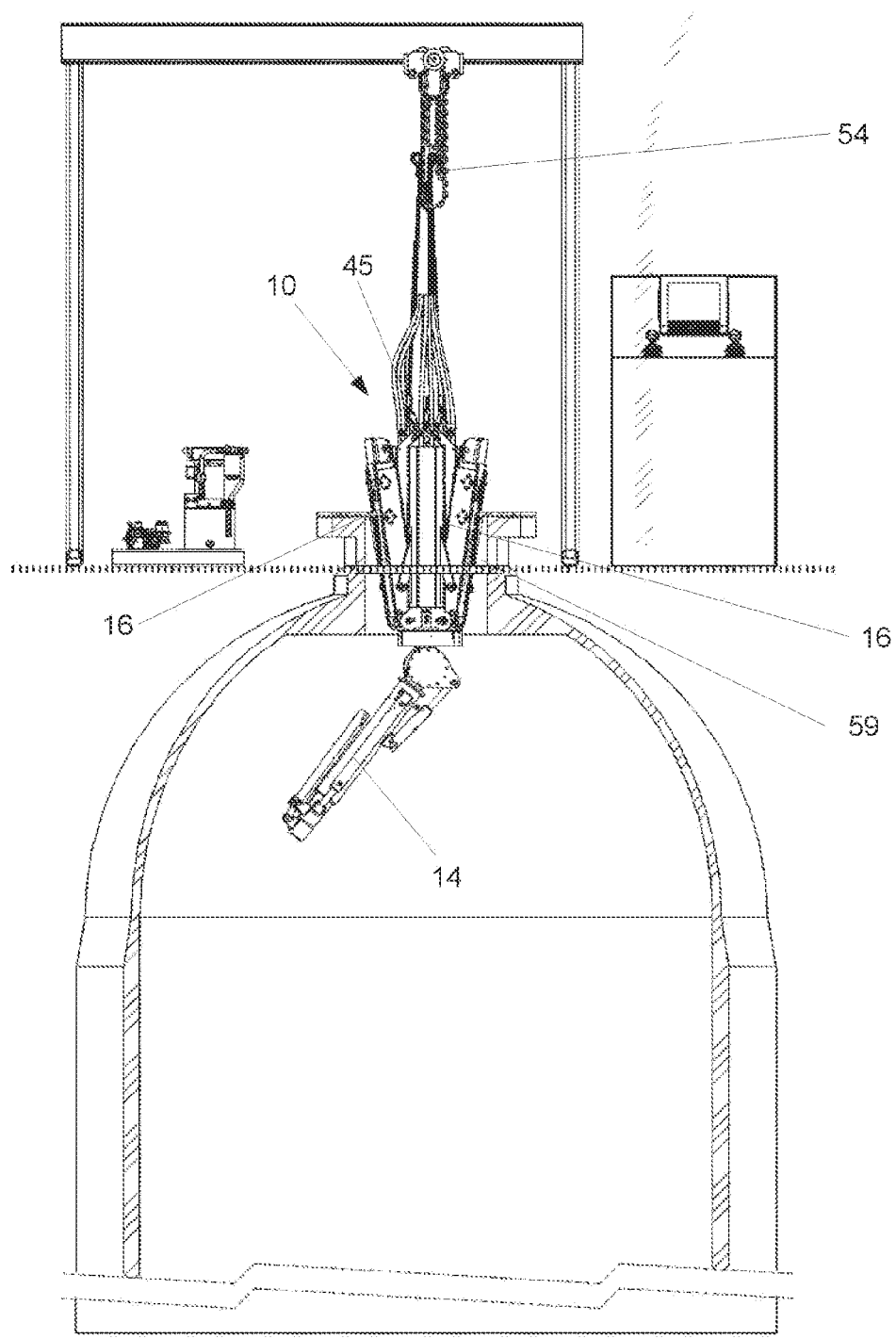
FIG. 14 illustrates the system including the apparatus having the crane and the launching support cradle in a first in-use condition.
Figure 15:
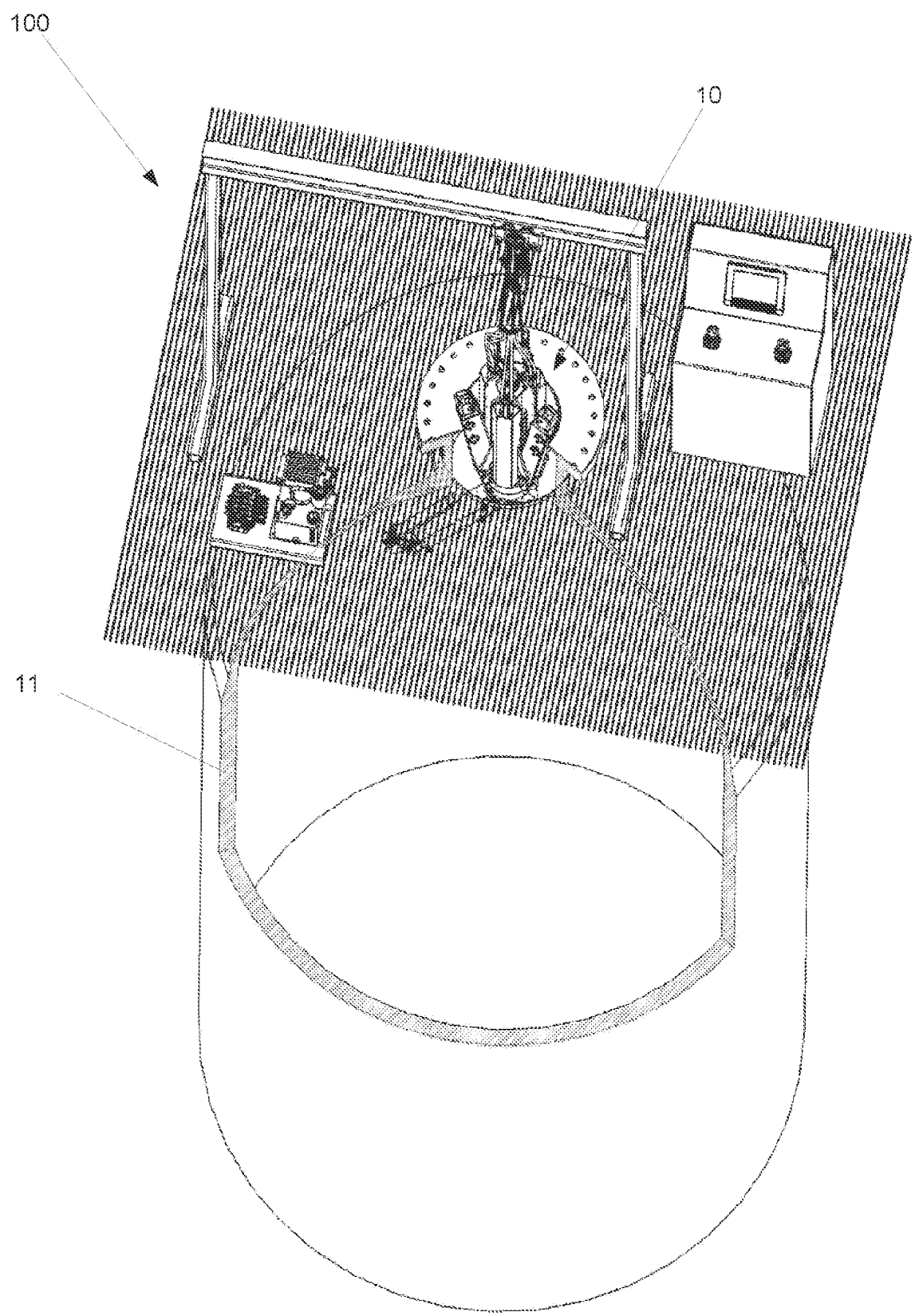
FIG. 15 illustrates a perspective top view of the system including the apparatus having the crane and the launch support cradle in the first in-use condition.

It is again noted that the plurality of support legs 16 may be outwardly pivoted by the central actuator 32, whilst retracted, to initially secure the main body 12 with the launch cradle 59 at the opening 20 of the tank 11 in a first in-use condition as best shown in FIG. 14. This allows the working arm 14 to have good access to the top or upper section of the tank 11. The launch cradle 59, that is preferably conical, assist with the fit and protecting the tank 11. In this position, the working arm 14 is still fully rotational and pivotal.

The plurality of support legs 16 may then be slightly pivoted back toward the main body 12, and then the main body 12 may be lowered through the opening 20 to an initial internal position inside of the tank 11 using the crane 56 as controlled by the external control unit 102. The plurality of support legs 16 are then pivoted toward the side wall 20 of the tank 11, to the intermediate lowered condition in which the plurality of support legs 16 are in over-centre position relative to the pivot point 27. Once in the intermediate lowered condition, the plurality of support legs 16 are telescopically extended to the extended condition so as to engage the side wall thereby supporting the apparatus 10 within the tank in the supported state and thus providing a second in-use condition as best shown in FIG. 16.

It is noted that extension of the plurality of support legs 16 may start prior to the over-centre position being reached. However, preferably, final engagement between the plurality of support legs 16 and the tank is not initiated until the over-centre position is reached. The movement of the plurality of support legs, being remotely controlled by the external control unit 102.

To adjust the lateral position of the main body 12 within the tank 11, in the supported state, the plurality of support legs 16 are independently moved. The tension of the tether 54 may need to be released—with the main body 12 being fully supported by the plurality of support leg 16 whilst being laterally moved.

Once in an operative position, in either the first or second in-use conditions, the working arm 14 may be operated such as being rotated and pivoted as desired by the user via the external control unit 102. The telescopic conduits 50 may then be extended as desired. The external control unit 102 may also include a vacuum control switch to operate a vacuum suction source coupled to the apparatus 10 via a line 81 (not shown) ultimately connected to the working arm 14.

During the above operations, the user may be located remote to the tank 11 and apparatus 10 and be operating the system 100 by the external control unit 102 such as actuating the user input 104 and viewing the apparatus 10 via the screen 112.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference in this specification to any known matter or any prior publication is not, and should not be taken to be, an acknowledgment or admission or suggestion that the known matter or prior art publication forms part of the common general knowledge in the field to which this specification relates.

While specific examples of the invention have been described, it will be understood that the invention extends to alternative combinations of the features disclosed or evident from the disclosure provided herein.

Many and various modifications will be apparent to those skilled in the art without departing from the scope of the invention disclosed or evident from the disclosure provided herein.

What is claimed is:

1. An apparatus for vacuum cleaning a tank, the apparatus including a main body coupled to a working arm, a plurality of support legs coupled to the main body at main body pivot points and struts coupled between each of the plurality of support legs and a common central actuator, wherein the main body includes a main conduit extending lengthwise therethrough and the common central actuator includes a cylinder fitted about the main conduit and moveable relative thereto, wherein the struts are operatively coupled to the cylinder of the common central actuator so that the plurality of support legs are moveable between a collapsed condition, in which the plurality of support legs are positioned alongside the main conduit so as to allow the main body to pass through an opening of the tank, and an extended condition in which the plurality of support legs are moved relatively outwardly.

2. The apparatus according to claim 1, wherein the common central actuator and struts are arranged to pivot each of the plurality of support legs about the main body pivot points to an over centre position relative to the main body pivot points in which the plurality of support legs are engagable with the tank in the extended condition.

3. The apparatus according to claim 1, wherein a first end of the strut is pivotally coupled to the common central actuator via a central pivot arrangement and a second end of the strut is pivotally coupled to a respective one of the plurality of support legs at a position spaced apart from the main body pivot points.

4. The apparatus according to claim 1, wherein each of the plurality of support legs includes an outer member and an inner member, the outer member being linearly telescopically extendable relative to the inner member to engage with a side wall of the tank.

5. The apparatus according to claim 4, wherein each of the inner members are pivotally coupled to the main body and are pivoted toward the side wall of the tank in the extended condition such that the outer members engage with the side wall of the tank upon telescopic extension thereof.

6. The apparatus according to claim 5, wherein each of the inner members have respective proximate ends pivotally coupled to the main body, and wherein the apparatus includes struts that extend respectively between the common central actuator and each of the inner members.

7. The apparatus according to claim 6, wherein the common central actuator and struts are arranged to pivot the each of the inner members to an over centre position supported by the struts.

8. The apparatus according to claim 7, wherein each of the plurality of support legs includes a linear actuator substantially housed lengthwise along respective ones of the inner members, the linear actuator being adapted to telescopically extend and retract the outer members.

9. The apparatus according to claim 1, wherein the common central actuator is a hollow hydraulic cylinder type actuator.

10. The apparatus according to claim 1, wherein each of the plurality of support legs are adapted to be individually linearly telescopically extendable to engage with a side wall of the tank.

11. The apparatus according to claim 1, wherein each of the plurality of support legs are independently extendable such that the main body is laterally moveable within the tank in a supported state.

12. The apparatus according claim 1, wherein the main body includes a top adapted to be coupled with a support tether, a side toward which the plurality of support legs are positioned in the collapsed condition and an opposing bottom, the working arm being movably coupled to the bottom of the main body.

13. The apparatus according to claim 1, wherein the working arm further includes a vacuum conduit in fluid communication with the main conduit, wherein the vacuum conduit is coupled to the main conduit by a moveable vacuum swivel joint.

14. The apparatus according to claim 13, wherein the vacuum swivel joint is adapted to allow the working arm to move in a range of motion including a rotational motion of about 360 degrees relative to a vertical axis and a pivotal motion between a lowered vertical position about in line with the vertical axis and a raised position angled at about 60 degrees relative to the vertical axis.

15. The apparatus according to claim 13, wherein the vacuum swivel joint includes a housing and a movable conduit within the housing, the moveable conduit defining a passage between the vacuum conduit and the main conduit.

16. The apparatus according to claim 15, wherein the housing and the movable conduit are arranged such that a cross sectional area of the passage is substantially maintained over a range of motion.

17. The apparatus according to claim 15, wherein the housing includes a first aperture in fluid communication with the main conduit and a second elongate conduit that extends in a circumferential direction, and wherein the movable conduit is defined by an inner section moveable within the housing, the inner section including a first inner elongate aperture that extends in a circumferential direction in fluid communication with the first aperture of the housing and a second inner aperture that communicates with the vacuum conduit through the second elongate conduit of the housing.

18. The apparatus according to claim 1, the apparatus being adapted to communicate with a remotely located controller adapted to allow remote control of the apparatus within the tank.

19. An apparatus for vacuum cleaning a tank, the apparatus including a main body coupled to a vacuum conduit and a plurality of support legs coupled to the main body, wherein the main body includes a main conduit extending lengthwise therethrough and a common central actuator including a movable cylinder fitted about the main conduit, and wherein the vacuum conduit is in communication with the main conduit via a vacuum swivel joint, wherein the plurality of support legs are operatively coupled to the cylinder of the common central actuator so as to be moveable between a collapsed condition, in which the plurality of support legs are positioned alongside the main conduit so as to allow the main body to pass through an opening of the tank, and an extended condition in which the plurality of support legs are extended within the tank, and wherein the vacuum swivel joint is adapted to allow the vacuum conduit to move in a range of motion including a rotational motion of about 360 degrees relative to a vertical axis and a pivotal motion between a lowered position and a raised position.

20. An apparatus for vacuum cleaning a tank, the apparatus including a main body coupled to a working arm and a plurality of support legs coupled to the main body at a main body pivot points, wherein the main body includes a main conduit extending lengthwise therethrough and a common central actuator including a movable cylinder fitted about the main conduit, and the working arm includes a vacuum conduit in fluid communication with the main conduit, wherein each of plurality of support legs are operatively coupled to the movable cylinder of the common central actuator by respective struts so as to be simultaneously moveable between a collapsed condition, an intermediate condition, and extended condition, wherein in the collapsed condition the plurality of support legs are positioned alongside the main conduit in a retracted state so as to allow the main body to pass through an opening of the tank, in the intermediate condition the struts support the plurality of support legs in an over centre position relative to the main body pivot points, and in the extended condition in which the plurality of support legs are telescopically extended to an extended state within the tank.

* * * * *